(12) United States Patent
Perahia et al.

(10) Patent No.: US 8,374,105 B1
(45) Date of Patent: Feb. 12, 2013

(54) HIGH DATA RATE WIRELESS BRIDGING

(75) Inventors: Eldad Perahia, Sunnyvale, CA (US);
Bretton Douglas, Sunnyvale, CA (US);
David Pignatelli, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 997 days.

(21) Appl. No.: 12/011,546

(22) Filed: Jan. 28, 2008

Related U.S. Application Data

(62) Division of application No. 10/335,500, filed on Dec. 31, 2002, now Pat. No. 7,352,688.

(51) Int. Cl.
*H04K 1/10* (2006.01)
*H04L 27/28* (2006.01)

(52) U.S. Cl. .......................... 370/260; 375/259

(58) Field of Classification Search .................... 375/260
See application file for complete search history.

(56) References Cited

U.S. PATENT DOCUMENTS

| | | | |
|---|---|---|---|
| 5,600,672 A | 2/1997 | Oshima et al. | |
| 5,973,642 A | 10/1999 | Li et al. | |
| 6,067,290 A | 5/2000 | Paulraj et al. | |
| 6,144,711 A | 11/2000 | Raleigh et al. | |
| 6,246,713 B1 | 6/2001 | Mattisson | |
| 6,310,709 B1 * | 10/2001 | Bergano | 398/185 |
| 6,473,467 B1 | 10/2002 | Wallace et al. | |
| 6,970,682 B2 * | 11/2005 | Crilly et al. | 455/78 |
| 7,024,123 B2 * | 4/2006 | Yano | 398/184 |
| 7,031,336 B2 | 4/2006 | Scherzer et al. | |
| 7,106,715 B1 | 9/2006 | Kelton et al. | |
| 7,151,740 B2 | 12/2006 | Zhang et al. | |
| 7,301,924 B1 | 11/2007 | Gurbuz et al. | |
| 7,352,688 B1 | 4/2008 | Perahia et al. | |
| 7,502,420 B2 * | 3/2009 | Ketchum | 375/267 |
| 2002/0111142 A1 | 8/2002 | Klimovitch | |
| 2002/0181439 A1 | 12/2002 | Orihashi et al. | |
| 2002/0183010 A1 | 12/2002 | Catreux et al. | |
| 2003/0012308 A1 | 1/2003 | Sampath et al. | |
| 2003/0016944 A1 | 1/2003 | Kato | |
| 2003/0020651 A1 * | 1/2003 | Crilly et al. | 342/378 |
| 2003/0072452 A1 | 4/2003 | Mody et al. | |
| 2003/0076777 A1 | 4/2003 | Stuber et al. | |
| 2003/0203717 A1 | 10/2003 | Chuprun et al. | |
| 2004/0252632 A1 | 12/2004 | Bourdoux et al. | |
| 2005/0100347 A1 * | 5/2005 | Yano | 398/188 |
| 2005/0265281 A1 * | 12/2005 | Ketchum | 370/328 |
| 2006/0018259 A1 * | 1/2006 | Kadous | 370/236 |
| 2007/0053282 A1 | 3/2007 | Tong et al. | |

OTHER PUBLICATIONS

IEEE Standard 802.11a-1999."Part 11:Wireless LAN Medium Access Control (MAC)and Physical Layer(PHY)specifications High-speed Physical Layer in the 5 GHz Band,"Sep. 1999,pp. 1-83.

\* cited by examiner

*Primary Examiner* — Erin File
(74) *Attorney, Agent, or Firm* — Cindy Kaplan

(57) ABSTRACT

A specialized preamble is provided to facilitate matrix channel estimation of a MIMO channel. In a particular implementation, a channel training preamble provided by the IEEE 802.11a standard is modified to facilitate MIMO channel estimation.

20 Claims, 6 Drawing Sheets

HIGH DATA RATE WIRELESS BRIDGING

STATEMENT OF RELATED APPLICATIONS

This patent application is a divisional of U.S. patent application Ser. No. 10/335,500, filed Dec. 31, 2002, which is incorporated herein by reference in its entirety.

The present application is related to the subject matter of:

U.S. Pat. No. 6,377,631, issued on Apr. 23, 2002, entitled "TRANSMITTER INCORPORATING SPATIO-TEMPORAL PROCESSING;"

U.S. patent application Ser. No. 10/197,300, filed Jul. 15, 2002, entitled "MEDIA ACCESS CONTROL FOR MIMO WIRELESS NETWORK;"

U.S. patent application Ser. No. 10/207,694, filed Jul. 29, 2002, entitled "POINT-TO-POINT MAC PROTOCOL FOR HIGH SPEED WIRELESS BRIDGING."

The contents of the above are incorporated herein by reference for all purposes in their entirety.

BACKGROUND OF THE INVENTION

The present invention relates generally to communications and more particularly to systems and methods for wireless communications.

As the Internet continues its development and as workers and consumers increasingly rely on data networking to assist their day-to-day tasks, a need arises to extend network connectivity to locations where there is no convenient connection to a wired infrastructure. Workers desire to send and receive email and access the Internet and their corporate intranet even when they are away from their workstation. Consumers wish to establish home networks without costly and cumbersome wiring. Accordingly, wireless communication standards have evolved including the IEEE 802.11 family.

The current IEEE 802.11a standard allows for wireless communicates at speeds between 6 Mbps and 54 Mbps. It is desirable to further increase these speeds to accommodate delivery of multimedia wireless services and facilitate outdoor wireless bridging between indoor networks. It is also desirable to accommodate the increased data rates by increasing spectral efficiency rather than by increasing bandwidth.

One known way of increasing spectral efficiency is the use of MIMO (Multiple Input Multiple Output) processing techniques. MIMO techniques take advantage of multiple antennas (or multiple polarizations of the same antenna) at the transmitter and receiver to access multiple channel inputs and channel outputs and thereby define multiple spatial subchannels that occupy the same bandwidth but nonetheless are capable of carrying independent data streams. The delineation of the multiple spatial subchannels may involve weighting of the antenna inputs at the transmitter end and/or weighting of the antenna outputs at the receiver end. For further information on MIMO techniques, see U.S. Pat. No. 6,377,631.

It is desirable to apply MIMO techniques to IEEE 802.11 systems to increase data carrying capacity, but there are obstacles to overcome. The 802.11 standards do not currently specify MIMO transmission techniques. In particular, MIMO transmission techniques preferably take advantage of an estimate of the MIMO channel response. The MIMO channel response is represented by a matrix composed of elements corresponding to each combination of channel input and channel output. By contrast, 802.11a, for example, provides only for estimating a conventional channel response that assumes a single input and a single output.

It would be desirable to maximize the usage of 802.11 techniques and components in a MEMO wireless communication system while still meeting the MIMO requirement of obtaining a MIMO matrix channel estimate. It is furthermore generally desirable to use MIMO techniques to increase the capacity of 802.11 networks.

SUMMARY OF THE INVENTION

By virtue of one embodiment of the present invention, a specialized preamble is provided to facilitate matrix channel estimation of a MIMO channel. In a particular implementation, a channel training preamble provided by the IEEE 802.11a standard is modified to facilitate MIMO channel estimation.

A first aspect of the present invention provides a method for transmitting a signal. The method includes: transmitting a first OFDM signal via a first antenna element, transmitting a second OFDM signal—co-channel to the first OFDM signal—via a second antenna element, transmitting channel training information in the first OFDM signal while inhibiting transmission of the second OFDM signal, and transmitting channel training information in the second OFDM signal while inhibiting transmission of the first OFDM signal.

A second aspect of the present invention provides a method for receiving a signal. The method includes: receiving a first OFDM signal via a first antenna element, receiving a second OFDM signal via a second antenna element, and during a first channel training period—within each of a plurality of frequency subchannels—obtaining received signal measurements via the first antenna element and via the second antenna element, during a second channel training period—within each of a plurality of frequency subchannels—obtaining received signal measurements via the first antenna element and via the second antenna element, and measuring a MIMO channel response based on the measurements made during the first channel training period and the second channel training period.

A third aspect of the present invention provides a method for transmitting a signal. The method includes: transmitting a first OFDM signal via a first antenna element, transmitting a second OFDM signal, co-channel to the first OFDM signal, via a second antenna element, and during a channel training period, transmitting channel training information simultaneously in a first set of subcarriers of the first OFDM signal and in a second set of subcarriers of the second OFDM signal, the first set of subcarriers and the second set of subcarriers being non-overlapping.

A fourth aspect of the present invention provides a method for receiving a signal. The method includes: receiving a first OFDM signal via a first antenna element, receiving a second OFDM signal—co-channel to the first OFDM signal—via a second antenna element, during a channel training period, obtaining received signal measurements in a first set of subcarriers and a second set of subcarriers, the first set of subcarriers and the second set of subcarriers being non-overlapping, and measuring a MIMO channel response based on the measurements made during the channel training period. Transmissions from different remote antenna elements are expected in the first set of subcarriers and the second set of subcarriers during the channel training period.

Further understanding of the nature and advantages of the inventions herein may be realized by reference to the remaining portions of the specification and the attached drawings.

DESCRIPTION OF SPECIFIC EMBODIMENTS

Although having very broad applicability, the present invention will be described with reference to a representative network environment, a wireless communication network based on the IEEE 802.11 standard, and in one particular implementation, the IEEE 802.11a standard. The IEEE 802.11g standard is considered to be highly similar to the 802.11a standard in many respects and wherever the present application refers to the 802.11a standard, it will be understood that this encompasses the 802.11g standard as well. Familiarity with the technical details of these standards will be assumed in the discussion that follows. Relevant descriptive materials regarding the IEEE 802.11 standards may be found in the following documents:

Information technology—Telecommunications and information exchange between systems—Local and metropolitan area networks specific requirements—Part 11: Wireless LAN Medium Access Control (MAC) and Physical Layer (PHY) Specifications (1999).

Information technology—Telecommunications and information exchange between systems—Local and metropolitan area networks specific requirements—Part 11: Wireless LAN Medium Access Control (MAC) and Physical Layer (PHY) Specifications (1999): High Speed Physical Layer in the 5 GHz Band, hereinafter "High Speed Physical Layer in the 5 GHz Band".

The contents of these standards documents are herein incorporated by reference for all purposes in their entirety.

The IEEE 802.11a standard employs orthogonal frequency division multiplexing (OFDM) as known in the art. In OFDM, the available bandwidth is effectively divided into a plurality of subchannels that are orthogonal in the frequency domain, each such subchannel being occupied by a "subcarrier" or tone. For each successive OFDM symbol, a complex value is assigned to each subcarrier. To create the baseband time domain signal for transmission, an IFFT is applied to a series of 64 complex subcarrier values to obtain 64 time domain samples. In 802.11a, some of the values are always zero and others carry pilot tones used for phase synchronization. The resulting series of time domain samples is augmented with a cyclic prefix prior to transmission. The use of the cyclic prefix assures the orthogonality of the subcarriers. The cyclic prefix addition process can be characterized by the expression:

$$[z(1) \ldots z(N)]^t \mapsto [z(N-v+1) \ldots z(N) z(1) \ldots z(N)]^T$$

Figure 1:
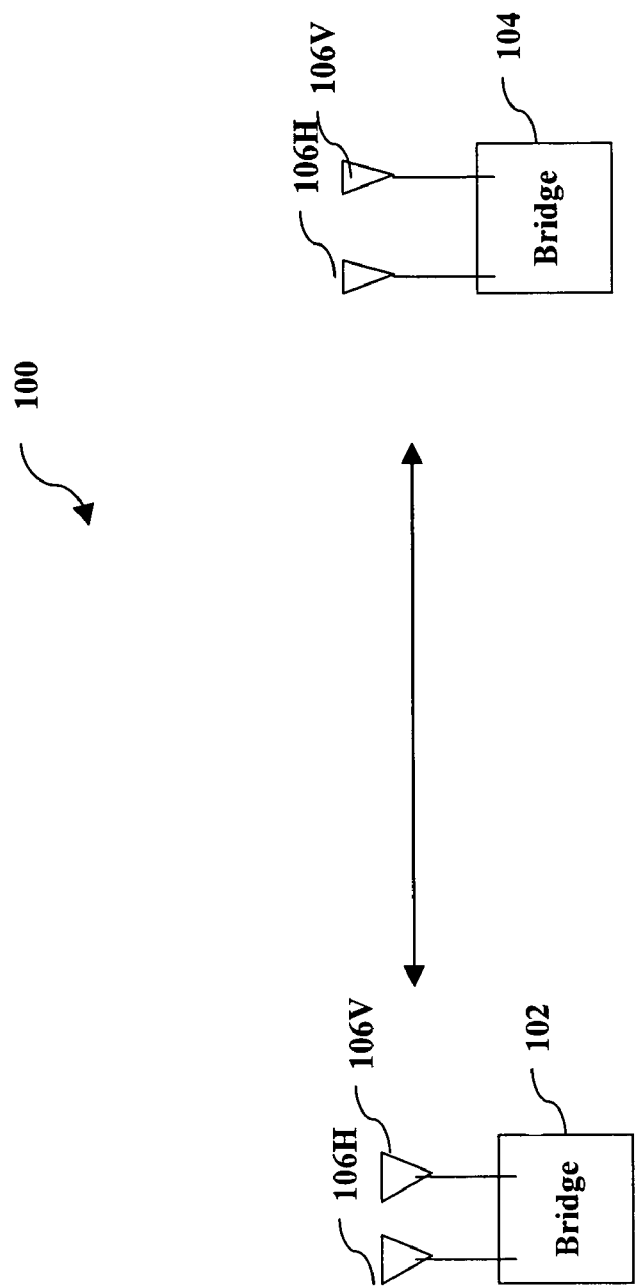
FIG. 1 depicts a wireless bridge configuration according to one embodiment of the present invention.

FIG. 1 depicts a representative wireless communication link 100 to which embodiments of the present invention may be applied. Communication link interconnects two nodes 102 and 104 which may be wireless bridges. In one embodiment, wireless bridges 102 and 104 interoperate in accordance with the IEEE 802.11 standard, enhanced and extended as described herein. In one particular implementation, the physical layer interaction is defined by the IEEE 802.11a standard. Any wireless communication protocol suite consistent with the present invention may be used.

Each of the bridges is equipped with two antenna elements 106H and 106V. These two antenna elements may represent the horizontal and vertical polarizations of the same antenna or may represent two different antennas. By use of two antenna elements on each bridge, a multiple input multiple output (MIMO) channel is established between the bridges. Any number of antenna elements may be used within the scope of the present invention. Here the MIMO channel has two inputs and two outputs but the number of either inputs or outputs may be increased further in accordance with the present invention.

To enhance information carrying capacity, distinct signals are transmitted via the two antenna elements on one bridge. The other bridge is able to receive two distinct signals by appropriate weighting of the signal received on its own two antenna elements. The two transmitted signals share the same frequency allocation yet nonetheless may be recovered separately. In this way, two independent spatial subchannels are established and the data carrying capacity of the wireless communication link may be doubled. For example, in an IEEE 802.11a system, the maximum data carrying capacity may be increased from 54 Mbps to 108 Mbps. This is particularly useful in connecting wireless bridges as are used for backhaul and outdoor interbuilding links.

Figure 2:
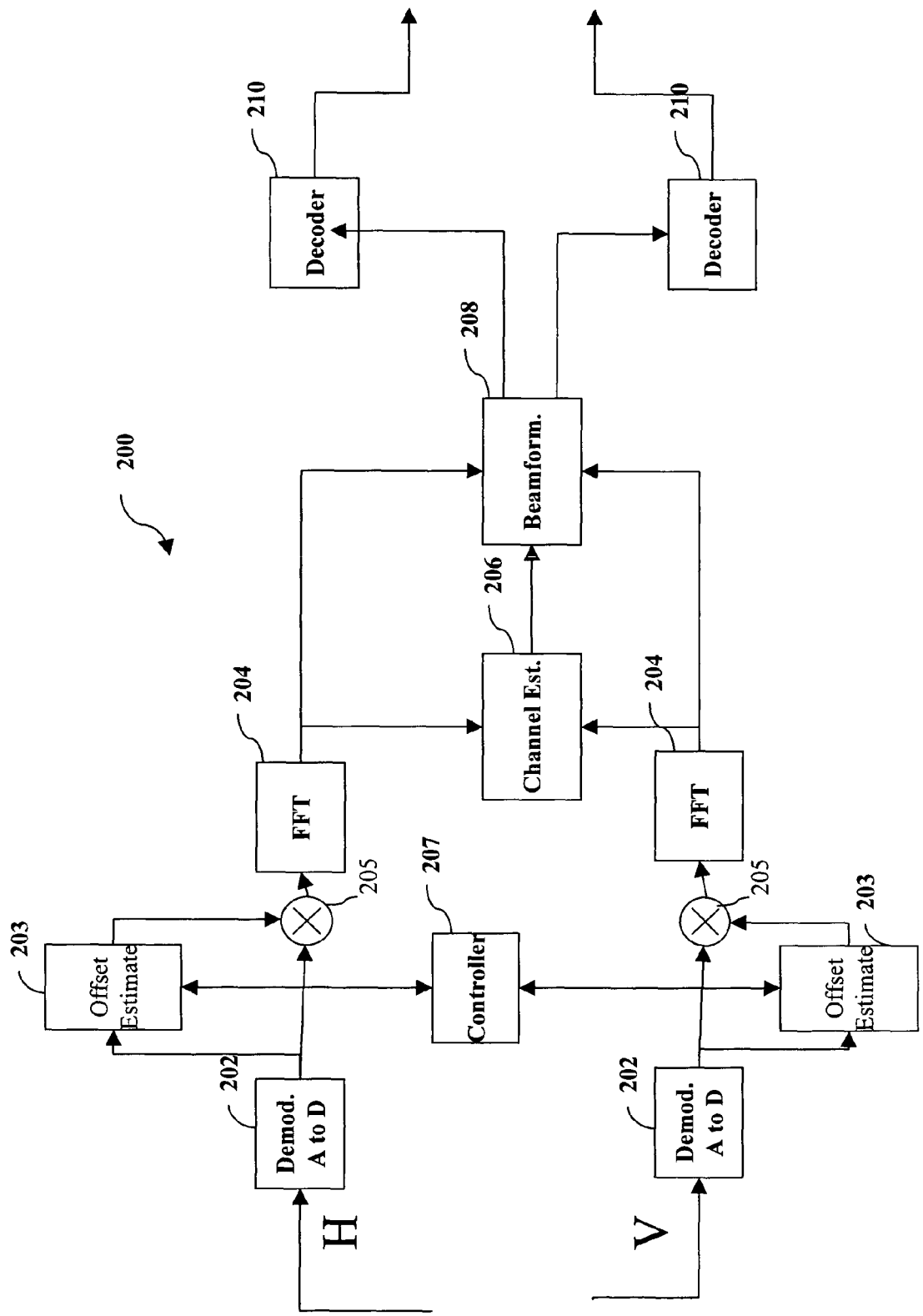
FIG. 2 depicts a MIMO receiver according to one embodiment of the present invention.

FIG. 2 depicts a MIMO receiver 200 as would be included in one of the bridges of FIG. 1. The horizontal and vertical antenna polarizations 106H and 106V are coupled to separate demodulators/analog to digital converters 202 respectively. These blocks perform RF amplification and filtering, down-conversion to an intermediate frequency (IF), IF filtering, downconversion to baseband, and conversion to digital form. Offset estimation blocks 203 measure the phase and frequency offsets of the received signal relative to local timing based on preamble structure as will be explained below. One receiver chain acts a timing master so that its measured offset serves to synchronize both chains. A controller 207 manages the process of selecting the timing master and passing synchronization to the other receiver chain which acts as a slave. Blocks 205 shift the frequency and phase of the received signal based on the measured offsets for synchronization to local timing. Global timing based on the guard band is also handled in this way, being determined by the master and transferred to the slave.

Since the IEEE 802.11a standard employs orthogonal frequency division multiplexing (OFDM), the next step is to convert the time domain digital data streams into the frequency domain using FFT blocks 204. The cyclic prefixes associated with each OFDM symbol are removed prior to processing by FFT blocks 204. The output of each FFT block 204 is a stream of complex signal values received in each of the 64 subcarriers.

As will be explained below, a channel estimation block 206 determines the MIMO matrix channel response based on measurements made during special channel training periods when channel training information is sent. The matrix channel estimate is provided on a subcarrier-by-subcarrier basis. A beamforming block 208 applies weightings determined based on the channel estimates to the received horizontal and vertical data streams to obtain the two parallel transmitted data streams. These data streams are then subject to further decoding, deinterleaving, and descrambling by decoders 210.

Figure 3:
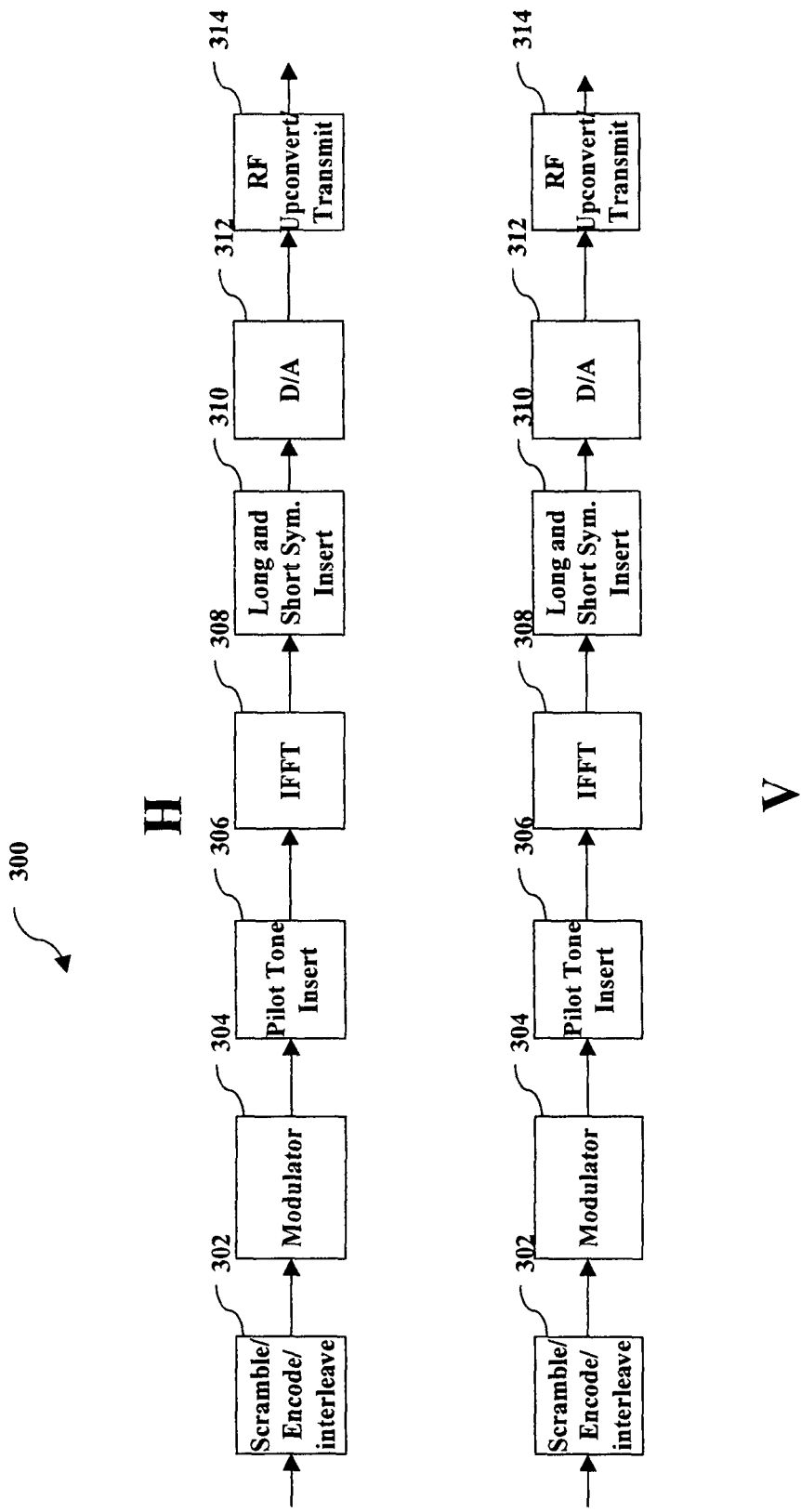
FIG. 3 depicts a MIMO transmitter according to one embodiment of the present invention.

FIG. 3 depicts a MIMO transmitter system 300 according to one embodiment of the present invention. In this depicted implementation, signals for the horizontal and vertical antenna polarizations are generated separately in parallel. It is also possible to employ spatial processing at the transmitter end by defining antenna element weights corresponding to two spatial subchannels. Here, instead a first spatial subchannel is simply mapped to the horizontal antenna polarization and a second spatial subchannel is mapped to the vertical antenna polarization.

Data is first scrambled, encoded, interleaved in an encoding block 302 as defined by the IEEE 802.11a standard. Modulators 304 translate the coded data bits into complex values to be assigned to OFDM subcarriers in accordance with the currently selected modulation scheme (4-QAM, 16-QAM, etc.) A pilot tone insertion block 306 inserts pilot tones at subcarrier positions defined by the IEEE 802.11a standard to support phase offset synchronization at the receiver. IFFT blocks 308 convert groups of 64 subcarrier values from a frequency domain to the time domain. The output is a succession of OFDM symbols carrying payload data.

The IEEE 802.11a standard also provides for the use of a preamble including special symbols for use in synchronization and carrier estimation. In a transmitted frame or packet, this preamble precedes the data-carrying OFDM symbols. The preamble includes so-called short and long symbols. The portion of the packet including the long symbols is modified to facilitate MIMO channel estimation as it will be explained in greater detail below. Insertion blocks 310 insert the preamble symbols.

The digital signal generated by insertion block 310 is converted to analog by digital to analog converters 312. The complex baseband waveforms output by converters 312 are upconverted to an intermediate frequency (IF), amplified and filtered at the IF, converted to the transmission radio frequency (RF), further amplified and filtered, and then transmitted via the appropriate antenna element. A block 314 represents the various analog processing steps.

Figure 4:
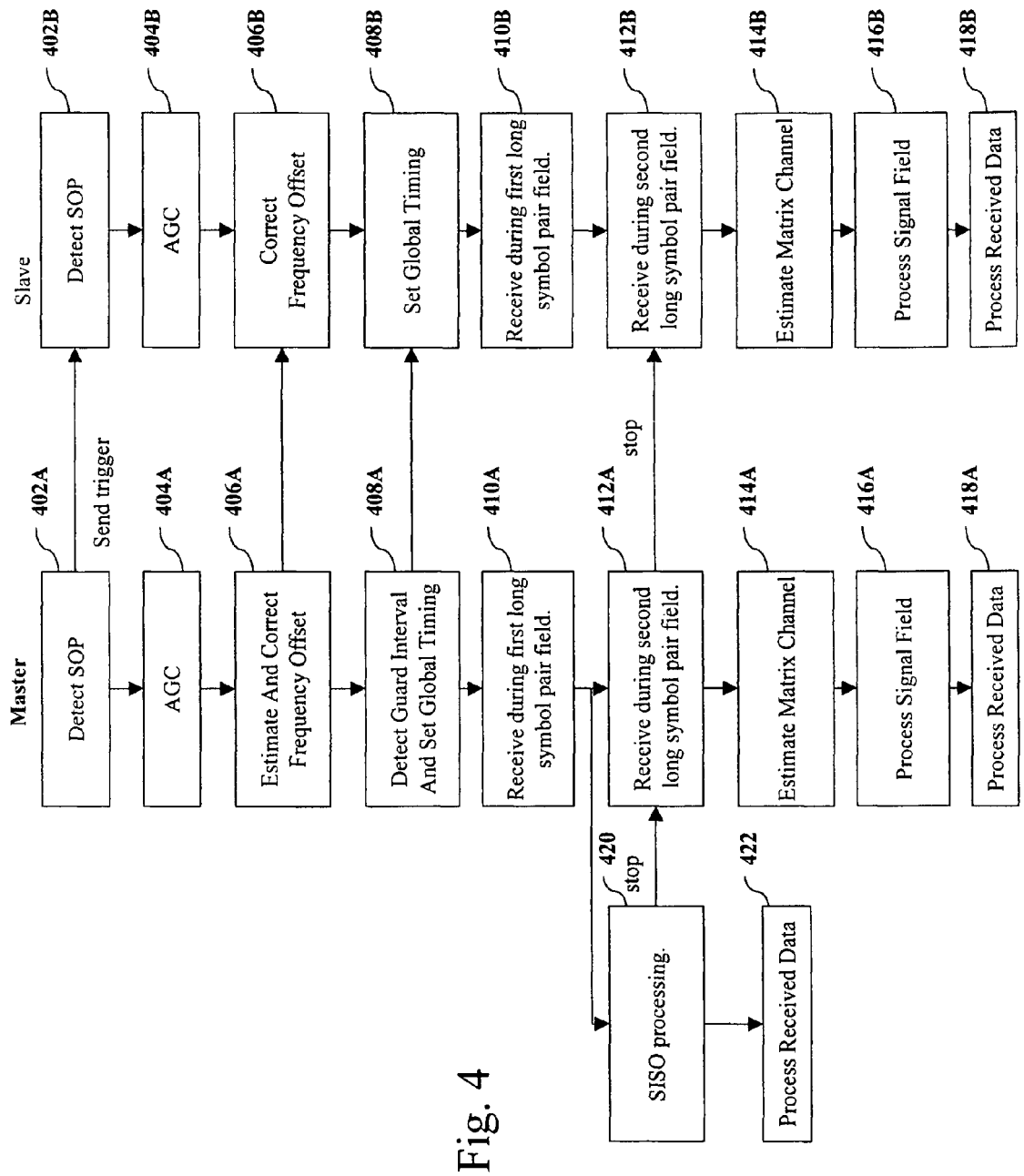
FIG. 4 is a flow chart describing steps of operating a MIMO receiver according to one embodiment of the present invention.

FIG. 4 is a flowchart describing steps of MIMO receiver operation with reference to a single received packet according to one embodiment of the present invention. Two parallel flows are presented corresponding to the two parallel receiver chains. At step 402A one of the receiver chains is the first to detect start of packet (SOP). The receiver chain that is the first to detect start of packet becomes the "master" for timing and frequency synchronization purposes while the receiver chain that subsequently detects start of packet at step 402B is the timing "slave". Then at steps 404A and 404B, both receiver chains separately perform an automatic gain control operation, setting amplifier gain in accordance with received signal strength. This operation takes place within blocks 202.

At step 406A, the receiver chain that has been designated as the master estimates the frequency offset based on the short symbols in the preamble using block 203 by employing the short symbol structure specified by the 802.11a standard and corrects for this offset using block 205. Alternatively, a local oscillator within block 202 may be adjusted to effectively shift the received frequency. The frequency offset that has been determined is transmitted to the slave receiver chain via controller 207. At step 406B, the slave receiver chain corrects its frequency offset using block 205. At step 408A the master receiver chain estimates global timing based on detection of a guard interval within the preamble and corrects its timing accordingly. The timing reference is sent to the slave receiver chain and the slave receiver chains synchronize its own timing at step 408B.

At step 410A and 410B, the receiver chains make measurements during a first long symbol field of the preamble. At steps 412A and 412B, the receiver chains make measurements during a second long symbol field of the preamble. At steps 414A and 414B, the channel estimation block 206 estimates the MIMO matrix channel based on the measurements of the two preceding steps. Steps 414A and 414B also obtains weightings among the antenna elements that will define independent received spatial subchannels. A so-called "SIGNAL" field follows the preamble. This field contains information about the modulation type to be used and the overall length of a packet. The "SIGNAL" field is processed at steps 416A and 416B. This is followed by the processing of data-carrying OFDM symbols at steps 418A and 418B.

Figure 5:
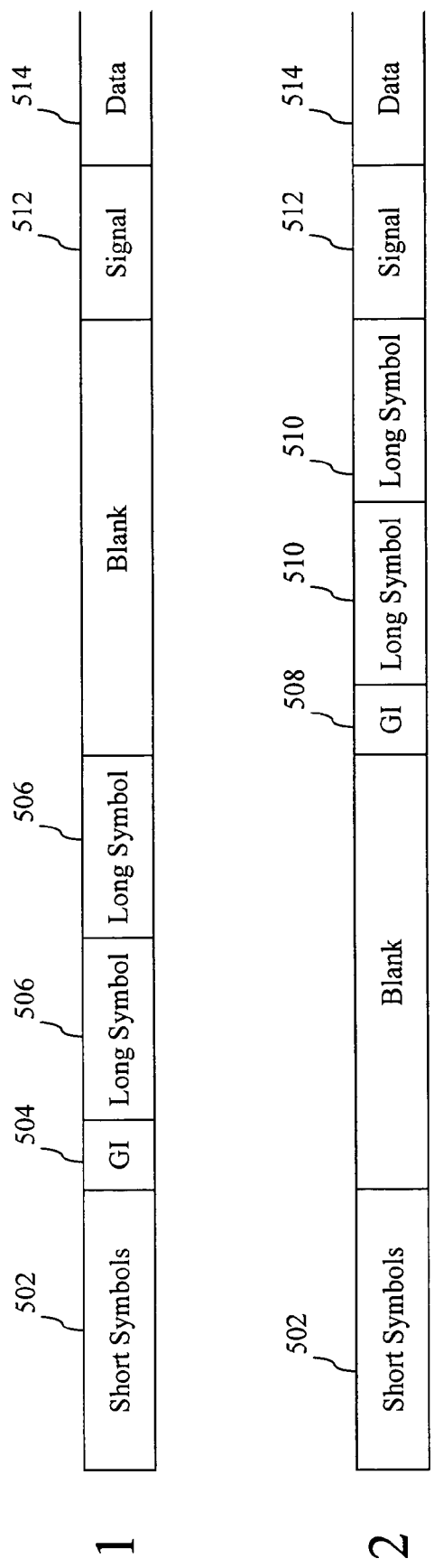
FIG. 5 depicts a preamble structure to facilitate MIMO channel estimation according to one embodiment of the present invention.

A more detailed description of the MIMO channel estimation procedure will benefit from an understanding of the modified preamble contents. FIG. 5 depicts a MIMO preamble structure according to one embodiment of the present invention. The transmitter antenna elements do not send identical preambles but rather the preamble structure is differentiated between them to facilitate estimation of the MIMO channel. In FIG. 5, the top preamble is for a transmitter antenna element referred to as antenna element 1 while the bottom preamble refers to an antenna element 2. The two preambles are transmitted simultaneously.

Each preamble begins with 10 short symbols 502 that are specified by the 802.11a standard and that are used for signal detection, automatic gain control, and frequency offset estimation. Each short symbol is specified to be 0.8 microseconds long.

A channel training period follows the short symbols. During a first portion of the channel training period, one antenna element transmits a guard interval 504 followed by two long symbols 506 while the other antenna element is quiet during this period. Then the first antenna element goes into a quiet period while the second antenna element, following a guard interval 508, also transmits two long symbols 510.

Both guard intervals are specified to be 1.6 microseconds long while each long symbol is specified to be 3.2 microseconds long. The long symbol values are preferably the same as those specified by the 802.11a standard. (See page 13 of "High Speed Physical Layer in the 5 GHz Band"). Here, however, the preamble is extended to allow independent measurement of the characteristics of each channel input output pair. After both antenna elements have transmitted their long symbols and thus completed the channel training period, they transmit signal fields 512 that designate modulation type and packet length followed by independent data streams 514.

Although the short symbol and long symbol are specified by the IEEE 802.11a standard in terms of their subcarrier values, it is also possible to precompute and store time domain sample values. This is why symbol insertion block 310 is shown after the IFFT stage in FIG. 3. It is also possible to use the specified frequency domain subcarrier values and insert these prior to IFFT block 308.

Further explanation of MIMO channel estimation and MIMO receiver processing will benefit from a mathematical model of the MIMO channel. All values are assumed to be complex and to vary over subcarrier position. A linear system model is given as follows:

$$\begin{bmatrix} Y_1(k) \\ Y_2(k) \end{bmatrix} = \begin{bmatrix} H_{1,1}(k) & H_{1,2}(k) \\ H_{2,1}(k) & H_{2,2}(k) \end{bmatrix} \begin{bmatrix} Z_1(k) \\ Z_2(k) \end{bmatrix} + \begin{bmatrix} N_1(k) \\ N_2(k) \end{bmatrix}$$

$$Y(k) = H(k)Z(k) + N(k)$$

where $Y_1(k)$ and $Y_2(k)$ are received signals on the two receiver antenna elements (1 and 2) for a tone or subcarrier k and $Z_1(k)$ and $Z_2(k)$ are transmitted signals on the two transmitter antenna elements (1 and 2). $N_1(k)$ and $N_2(k)$ refer to the noise received on the two receiver antenna elements.

The goal of channel estimation is to obtain the contents of the H matrix for each tone k. This is calculated based on received tone values during the long training symbols 506 and 510. Based on the first two long training symbols (transmitted by transmitter antenna element 1), the following may be obtained:

$$\hat{H}_{1,1}(k) = \frac{Y_1(k,1) + Y_1(k,2)}{2 \cdot LS(k)}$$

$$\hat{H}_{2,1}(k) = \frac{Y_2(k,1) + Y_2(k,2)}{2 \cdot LS(k)}$$

where $Y_1(k,1)$ and $Y_1(k,2)$ refer to the complex subcarrier values received via receiver antenna element 1 for tone k during the two long training symbols 506 respectively, and $Y_2(k,1)$ and $Y_2(k,2)$ refer to the comparable values for receiver antenna element 2. The term LS (k) refers to the known transmitted long training symbol value at tone k.

The two remaining H matrix values then are obtained from the long training symbols 510 transmitted by the second transmitter antenna element. These values are given as:

$$\hat{H}_{1,2}(k) = \frac{Y_1(k,1) + Y_1(k,2)}{2 \cdot LS(k)}$$

$$\hat{H}_{2,2}(k) = \frac{Y_2(k,1) + Y_2(k,2)}{2 \cdot LS(k)}$$

To suppress noise in the channel estimate, it is desirable to apply tone smoothing to the channel estimate. This may be done by using, e.g., a three-tap filter. The smoothed channel estimate can be given by:

$$|\tilde{H}_{i,j}(k)| = \frac{\sum_{m=-1}^{1} a_m \cdot |\hat{H}_{i,j}(k-m)|}{\sum_{m=-1}^{1} a_m}$$

$-25 \leq k \leq -2, 2 \leq k \leq 25$ $$\text{angle}\{\tilde{H}_{i,j}(k)\} = \frac{\sum_{m=-1}^{1} a_m \cdot \text{unw\_ang}\{\hat{H}_{i,j}(k-m)\}}{\sum_{m=-1}^{1} a_m}$$

$-25 \leq k \leq -2, 2 \leq k \leq 25$ $\tilde{H}_{i,j}(k) = \hat{H}_{i,j}(k)$ $k = -26, -1, 1, 26$ Note that in the calculation of angle $\{\tilde{H}_{i,j}(k)\}$, the angles of $\hat{H}_4(k)$ should be unwrapped prior to the calculation. This is denoted by the function "unw_ang". This means that as phases rotate across the tone measurements, their values are set to increase or decrease without bound rather than rotating through a $2\pi$ range. The tone smoothing weights are denoted by $a_m$. In an outdoor application where the frequency response of the channel will be slowly varying from tone to tone, one can set $a_m=1$ for maximal gain with a three-tap filter.

With more frequency selectivity, one can set $a_{-1}=1$, $a_0=2$, and $a_{+1}=1$ for somewhat less smoothing. In order to not delay the decoding of the SIGNAL symbol, a non-smoothed channel estimate average can be used during the SIGNAL interval.

Having these smoothed channel estimates, weights can be generated based on a variety of approaches. In one implementation, a zero-forcing approach is used and weights are obtained as follows:

$$\begin{bmatrix} W_{1,1}(k) & W_{1,2}(k) \\ W_{2,1}(k) & W_{2,2}(k) \end{bmatrix} =$$

$$\begin{bmatrix} \tilde{H}_{2,2}(k) & -\tilde{H}_{1,2}(k) \\ -\tilde{H}_{2,1}(k) & \tilde{H}_{1,1}(k) \end{bmatrix} * \frac{1}{\tilde{H}_{1,1}(k)\tilde{H}_{2,2}(k) - \tilde{H}_{1,2}(k)\tilde{H}_{2,1}(k)}$$

Received signals can then be processed by beamformer 208 by use of:

$$\begin{bmatrix} \hat{Z}_1(k) \\ \hat{Z}_2(k) \end{bmatrix} = \begin{bmatrix} W_{1,1}(k) & W_{1,2}(k) \\ W_{2,1}(k) & W_{2,2}(k) \end{bmatrix} \begin{bmatrix} Y_1(k) \\ Y_2(k) \end{bmatrix}$$

$\hat{Z}(k) = W(k)Y(k)$ where $\hat{Z}_1(k)$ and $\hat{Z}_2(k)$ are the estimates of the data transmitted by transmitter antenna elements 1 and 2 on tone k. Alternative weight generating schemes can also be used such as a minimum mean square error approach (see U.S. Pat. No. 6,377,631).

In an alternative variant, the preamble structure of FIG. 5 is modified so that four or more long symbols are used on each transmitting antenna element. Channel estimation can thus be based on a longer measurement time span. This provides an increase in accuracy of the channel estimate at the expense of greater preamble overhead. Overall link overhead may be reduced, however, by use of the techniques presented in "MEDIA ACCESS CONTROL FOR MIMO WIRELESS NETWORK" as identified above.

Figure 6:
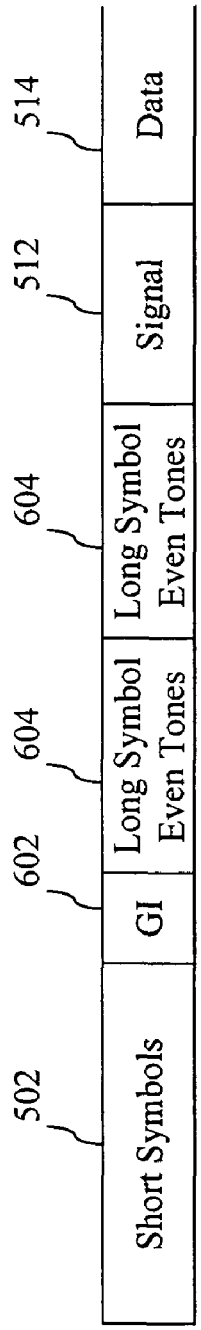
FIG. 6 depicts an alternative preamble structure to facilitate MIMO channel estimation according to one embodiment of the present invention.
Figure 6:
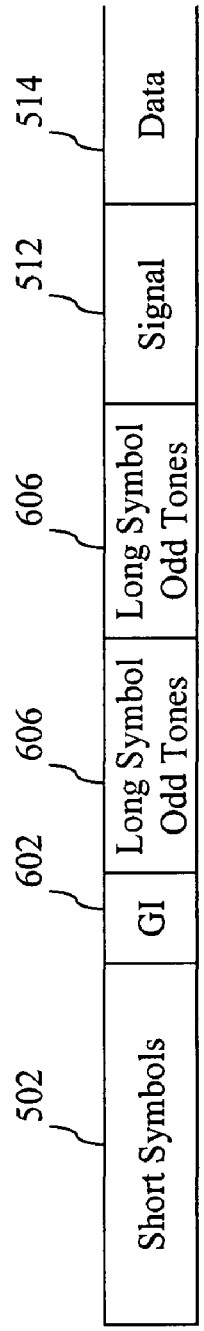

FIG. 6 depicts another alternative preamble structure. Like the structure of FIG. 5, each of the two preambles begins with the short symbols 502. Here, however, the two transmitter antenna elements transmit long symbols simultaneously but using nonoverlapping subsets of subcarriers. For example, following the short symbols and a guard interval 602, the first transmitter antenna element sends two long symbols 604 where the even subcarriers are set to their specified values while the odd subcarriers are set to zero. Simultaneously, the second transmitter antenna element transmits two successive long symbols 606 where the odd subcarriers are set to their specified values while the even subcarriers are set to zero.

Receiver processing is similar to what was described in relation to FIG. 5 for channel estimation. Here, the received long symbol complex subcarrier values are interpolated so that a received value is assigned to each subcarrier during each received long symbol even though only alternating subcarriers were transmitted. Any suitable interpolation scheme may be used in accordance with the present invention. After interpolation, channel estimation processing proceeds as above. This technique shortens the preamble to the length specified by the 802.11a standard without decreasing the effective time interval used for MIMO channel estimation. Further increase in channel estimation accuracy may be obtained by repeating the simultaneously transmitted long symbols with non-overlapping sets of active subcarriers one or more times as desired.

In the embodiments that have just been presented, both MIMO spatial subchannels carry the same data rate. However, it is possible to vary the amount of data carried by each subchannel in accordance with the signal to noise ratio or other index of channel quality as determined for each spatial subchannel. The table below presents data rates for a single spatial subchannel and the required signal to interference plus noise ratio (SINR) assuming a maximum 1% packet error rate, 3000 byte MAC layer packets split into two 1500 byte packets for transmission via each spatial subchannel, and a minimum of 15 dB of isolation between the spatial subchannels.

| Data Rate Mbps per spatial subchannel | Required SINR (dB) |
|---|---|
| 6 | 8.5 |
| 9 | 9.0 |
| 12 | 10.25 |
| 18 | 12.0 |
| 24 | 14.5 |
| 36 | 17.75 |
| 48 | 21.5 |
| 54 | 23.0 |

SINR information based on averages of the $H_{1,1}$ and $H_{2,2}$ channel estimates may be used to determine appropriate data rates for each spatial subchannel. These data rates may be determined at the receiver end and sent back to the transmitter in a special MAC layer message according to one embodiment of the present invention. Alternatively, SINR values may be sent back to the transmitter and the appropriate data rates for each spatial subchannel may be determined there.

If isolation between the spatial subchannels slips below 10 dB, it is preferable to abandon MIMO operation and instead send a single data stream using, e.g., a single transmitter element and one receiver element. It is also possible to use two receiver elements for diversity reception in SISO mode. Criteria for switching between MIMO and single input single output (SISO) operation are discussed in "POINT-TO-POINT MAC PROTOCOL FOR HIGH SPEED WIRELESS BRIDGING."

In one implementation, a receiver may detect SISO operation by attempting SISO processing in parallel with MIMO receiver processing. If data is successfully recovered using SISO operation when additional MIMO preamble information is expected, the SISO data recovery processing continues and MIMO processing is terminated. Returning again to FIG. 4, SISO receiver processing, e.g., processing through a single antenna element and receiver chain begins at step 420 in parallel with measurements made on the second long symbol field that would be expected in a MIMO signal. If step 420 successfully recovers data, as determined by decoder check sums, SISO receiver operation continues at step 422 and further MIMO processing is terminated.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In a wireless communication system, a method for receiving a signal, said method comprising:
   receiving a first OFDM signal via a first antenna element;
   receiving a second OFDM signal via a second antenna element;
   during a first channel training period, within each of a plurality of frequency subchannels, obtaining received signal measurements via said first antenna element and via said second antenna element;
   during a second channel training period, within each of a plurality of frequency subchannels, obtaining received signal measurements via said first antenna element and via said second antenna element; and
   measuring a MIMO channel response based on said measurements made during said first channel training period and said second channel training period;
   wherein a first transmitting antenna element is quiet during a portion of said first and second channel training periods and a second transmitting antenna element is quiet during another portion of said first and second channel training periods.

2. The method of claim 1 wherein channel training information transmitted during said first channel training period and said second channel training period is defined by the IEEE 802.11a standard.

3. The method of claim 1 wherein said first antenna element represents a horizontal polarization of an antenna and said second antenna element represents a vertical polarization of said antenna.

4. In a wireless communication system, a method for receiving a signal, said method comprising:
   receiving a first OFDM signal via a first antenna element;
   receiving a second OFDM signal, co-channel to said first OFDM signal, via a second antenna element;
   during a channel training period, obtaining received signal measurements in a first set of subcarriers and a second set of subcarriers, said first set of subcarriers and said second set of subcarriers being non-overlapping; and
   measuring a MIMO channel response based on said measurements made during said channel training period; and
   wherein transmissions from different remote antenna elements are expected in said first set of subcarriers and said second set of subcarriers during said channel training period and the remote antenna elements alternate even and odd subcarriers.

5. The method of claim 4 wherein said first antenna element represents a horizontal polarization of an antenna and said second antenna element represents a vertical polarization of said antenna.

6. The method of claim 4 wherein said first set of subcarriers and said second set of subcarriers alternate in order of frequency.

7. In a wireless communication system, apparatus for receiving a signal, said apparatus comprising:
   a first receiver block that receives a first OFDM signal via a first antenna element;
   a second receiver block that receives a second OFDM signal via a second antenna element;
   a channel estimation block that, within each of a plurality of frequency subchannels, during first and second channel training periods, obtains received signal measurements via said first and second receiver blocks, and that estimates a MIMO channel response based on said measurements;
   wherein a first transmitting antenna element is quiet during a portion of said first and second channel training periods and a second transmitting antenna element is quiet during another portion of said first and second channel training periods.

8. The apparatus of claim 7 wherein channel training information transmitted during said first channel training period and said second channel training period is defined by the IEEE 802.11a standard.

9. The apparatus of claim 7 wherein said first antenna element represents a horizontal polarization of an antenna and said second antennal element represents a vertical polarization of said antenna.

10. In a wireless communication system, apparatus for receiving a signal, said apparatus comprising:
    a first receiver block that receives a first OFDM signal via a first antenna element;
    a second receiver block that receives a second OFDM signal via a second antenna element; and
    a channel estimation block that, during a channel training period, obtaining received signal measurements in a first set of subcarriers and a second set of subcarriers, said first set of subcarriers and said second set of subcarriers being non-overlapping and measures a MIMO channel response based on said measurements made during said channel training period; and
    wherein transmissions from different remote antenna elements are expected in said first set of subcarriers and said second set of subcarriers during said channel training period and the remote antenna elements alternate even and odd subcarriers.

11. The apparatus of claim 10 wherein said first antenna element represents a horizontal polarization of an antenna and said second antenna element represents a vertical polarization of said antenna.

12. The apparatus of claim 10 wherein said first set of subcarriers and said second set of subcarriers alternate in order of frequency.

13. In a wireless communication system, apparatus for receiving a signal, said apparatus comprising:
    means for receiving a first OFDM signal via a first antenna element;
    means for receiving a second OFDM signal via a second antenna element;
    means for, during a first channel training period, within each of a plurality of frequency subchannels, obtaining received signal measurements via said first antenna element and via said second antenna element;
    means for, during a second channel training period, within each of a plurality of frequency subchannels, obtaining received signal measurements via said first antenna element and via said second antenna element; and
    means for measuring a MIMO channel response based on said measurements made during said first channel training period and said second channel training period;
    wherein a first transmitting antenna element is quiet during a portion of said first and second channel training periods and a second transmitting antenna element is quiet during another portion of said first and second channel training periods.

14. In a wireless communication system, apparatus for receiving a signal, said apparatus comprising:
    means for receiving a first OFDM signal via a first antenna element;
    means for receiving a second OFDM signal, co-channel to said first OFDM signal, via a second antenna element;
    means for, during a channel training period, obtaining received signal measurements in a first set of subcarriers and a second set of subcarriers, said first set of subcarriers and said second set of subcarriers being non-overlapping; and
    means for measuring a MIMO channel response based on said measurements made during said channel training period; and
    wherein transmissions from different remote antenna elements are expected in said first set of subcarriers and said second set of subcarriers during said channel training period and the remote antenna elements alternate even and odd subcarriers.

15. The method of claim 1 further comprising synchronizing a first receiver chain coupled to said first antenna element to a signal received via said antenna element and passing synchronization information from said first receiver chain to a second receiver chain coupled to said second antenna element.

16. The method of claim 15 further comprising synchronizing components of said second receiver chain based on said synchronization information passed from said first receiver chain.

17. The method of claim 15 further comprising selecting said first receiver chain as synchronization master and said second receiver chain as synchronization slave based on start of a packet being detected first by said first receiver chain.

18. The apparatus of claim 10 further comprising a first synchronization element within a first receiver chain coupled to said first antenna element, said first synchronization element operable to synchronize to a signal received via said first antenna element, wherein synchronization information is passed from said first receiver chain to a second receiver chain coupled to said second antenna element.

19. The apparatus of claim 18 wherein components of said second receiver chain are synchronized based on said synchronization information passed from said first receiver chain.

20. The apparatus of claim 7 wherein after said first channel training period and during said second channel training period, said first OFDM signal is processed to recover data and wherein only if data is not recovered during said second channel training period, said first OFDM signal and said second OFDM signal are thereafter processed as a MIMO signal.

* * * * *